United States Patent
Sellers

(10) Patent No.: US 11,496,515 B2
(45) Date of Patent: *Nov. 8, 2022

(54) HONEYPOT DEPLOYMENT BASED ON LIFECYCLE OF PROTECTED HOSTS

(71) Applicant: Rapid7, Inc., Boston, MA (US)

(72) Inventor: Thomas Eugene Sellers, Georgetown, TX (US)

(73) Assignee: Rapid7, Inc., Boston, MA (US)

(*) Notice: Subject to any disclaimer, the term of this patent is extended or adjusted under 35 U.S.C. 154(b) by 31 days.

This patent is subject to a terminal disclaimer.

(21) Appl. No.: 17/203,823

(22) Filed: Mar. 17, 2021

(65) Prior Publication Data

US 2021/0211465 A1  Jul. 8, 2021

Related U.S. Application Data

(63) Continuation of application No. 16/367,354, filed on Mar. 28, 2019, now Pat. No. 10,986,127.

(51) Int. Cl.
*H04L 9/40* (2022.01)

(52) U.S. Cl.
CPC ...... *H04L 63/1491* (2013.01); *H04L 63/1416* (2013.01)

(58) Field of Classification Search
CPC ............ H04L 63/1491; H04L 63/1416
USPC .............................................. 726/22
See application file for complete search history.

(56) References Cited

U.S. PATENT DOCUMENTS

| | | | |
|---|---|---|---|
| 8,713,306 B1* | 4/2014 | Bennett | H04L 63/1491 370/335 |
| 2009/0204964 A1* | 8/2009 | Foley | G06F 21/53 718/1 |
| 2020/0082075 A1* | 3/2020 | Rinaldi | G06F 12/1458 |

* cited by examiner

Primary Examiner — Michael S McNally
(74) Attorney, Agent, or Firm — Ashwin Anand

(57) ABSTRACT

Disclosed herein are methods, systems, and processes for dynamically deploying deception computing systems based on network environment lifecycle. Lifecycle metadata associated with protected hosts in a network is retrieved. A configurable ratio of honeypots to the protected hosts is accessed. One or more honeypots are deployed based on: the configurable ratio if the lifecycle metadata can be retrieved or determined, or on a schedule if the lifecycle metadata cannot be retrieved or determined, but can be estimated.

14 Claims, 9 Drawing Sheets

| Honeypot Dynamic Deployment Table 305 | | | |
|---|---|---|---|
| Lifecycle Metadata Field 310 | Configurable Ratio Field 315 | Protected Host Status Field 320 | Deployment Action Field 325 |
| Available | 1:100 | 1000 new hosts | Deploy 10 new honeypots |
| Available | 1:25 | 125 hosts offline | Discharge 5 honeypots |
| Available | None | 100 hosts offline | Perform host replacement |
| Available | None | 500 hosts online | Perform host replacement |
| No | Estimate | Estimate | Deploy to maintain estimate(s) |
| No | Estimate | Estimate | Disable to maintain estimate(s) |
| ... | ... | ... | ... |

FIG. 3 ent
HONEYPOT DEPLOYMENT BASED ON LIFECYCLE OF PROTECTED HOSTS

CROSS-REFERENCE TO RELATED APPLICATIONS

The present application claims the benefit (and is a Continuation) of pending U.S. patent application Ser. No. 16/367,354 titled "Dynamic Management of Deception Systems" and filed on Mar. 28, 2019," the entire disclosure of which is incorporated by reference herein.

BACKGROUND

Field of the Disclosure

This disclosure is related to deception systems implemented in cybersecurity computing environments. In particular, this disclosure is related to dynamically deploying and managing a fleet of honeypots based on a network environment's lifecycle.

Description of the Related Art

A honeypot is a physical or virtual computing system implemented in a network as a decoy to lure malicious actors (e.g., hackers) in an attempt to detect, deflect, and/or study hacking attempts. Such a deception system can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

Given the organizational and computational complexity of modern computing environments, implementing an effective fleet of honeypot can be expensive—both in terms of the technical skill required to accurately provision such a fleet as well as the computing resources demanded by such large-scale honeypot implementations. Unfortunately, arbitrarily provisioning honeypots in a network bears no relationship to the quantitative and/or qualitative nature (and/or requirements) of the (protected) computing systems operating in the network.

SUMMARY OF THE DISCLOSURE

Disclosed herein are methods, systems, and processes for dynamically deploying honeypots based on a lifecycle of a network environment. One such method involves retrieving lifecycle metadata associated with protected hosts in a network, accessing a configurable ratio of honeypots to the protected hosts, and deploying in or discharging from, the network, one or more honeypots based on the configurable ratio.

In one embodiment, the method involves determining that a protected host is no longer part of the network and performing a host replacement operation to replace the protected host with a honeypot that is an explicit personality clone of the protected host. In another embodiment, the method involves deploying or discharging honeypots based on a schedule if the lifecycle metadata associated with the protected hosts cannot be retrieved or determined but can be estimated.

In the foregoing embodiments, the lifecycle metadata includes Dynamic Host Configuration Protocol (DHCP) log data, data collected by an agent-based computing system, network infrastructure log data, or protected host data generated by direct monitoring.

In some embodiments, the method involves determining that the honeypots and the protected hosts do not share a Layer 2 (L2) network segment and modifying a network route in the network to direct attacker traffic to a network location of the honeypots. In other embodiments, deploying and discharging the honeypots is performed by a honeypot service and includes enabling and disabling the honeypot service.

In certain embodiments, the protected hosts include computing devices, the honeypots include deception computing devices, and each of the deception computing devices is a replica of a corresponding computing device.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

FIG. 3 is a table 300 that can be used to perform honeypot dynamic deployment, according to one embodiment of the present disclosure.

Figure 1:
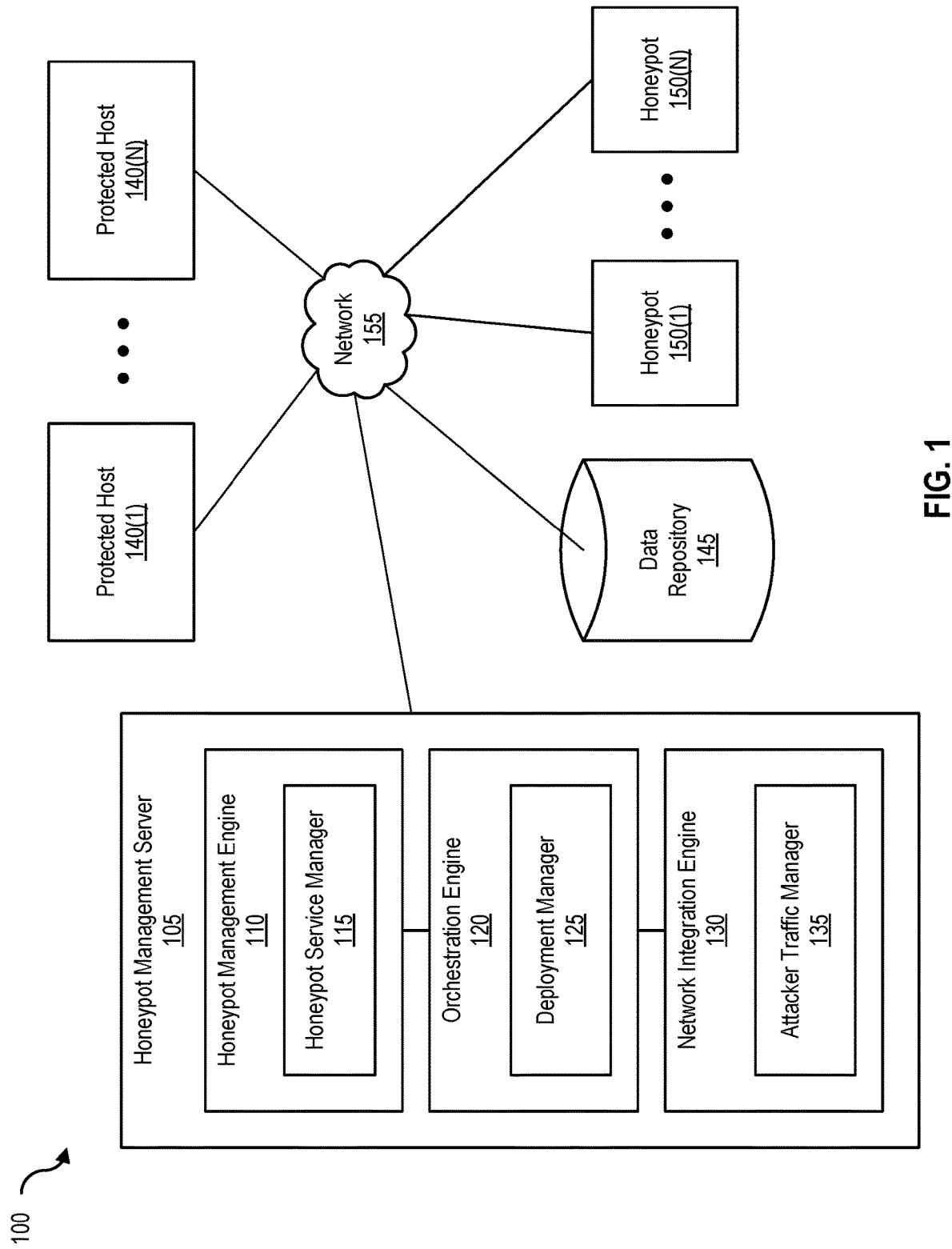
FIG. 1 is a block diagram 100 of a honeypot management server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern businesses and enterprises frequently face security-related threats from advanced persistent threat actors (e.g., hackers, foreign government entities, and other such malicious attackers). As previously noted, honeypots can be provisioned and implemented to detect, deflect, and/or study hacking attempts as well as gain valuable insight into a particular cyber-attack (and the corresponding malicious actor(s)). However, the effective deployment and management of honeypot fleets (both from a cost and resource perspective) poses particular technological challenges to modern businesses and enterprises that operate increasingly complex cybersecurity computing environments.

Typically, honeypots are implemented in a network environment in an arbitrary manner. For example, the number, duration, and configuration associated with the deployment of honeypot fleets and their constituent honeypots often bears no logical relationship to the network environment in which such honeypot fleets are meant to operate. Unfortunately, such arbitrary provisioning of honeypot fleets is not efficient or optimal for various reasons.

First, the security requirements and posture of a network environment is largely dictated by the qualitative and quantitative nature of various computing devices, network components, databases, storage devices, and the like, that are part of the given network environment. Therefore, given the organizational and computational complexity of modern cybersecurity computing environments, the lifecycle of a network environment takes on added importance in formulating an accurate cybersecurity risk calculus.

Second, provisioning and deploying honeypots is expensive—both from a cost perspective and a computing resource perspective. Because honeypots often mimic production hosts, a high level of fidelity may be required for a given honeypot or honeypot fleet to effectively entice an attacker. Provisioning computing resources merely for cybersecurity research for an extended duration of time and on various instances is prohibitively expensive and is somewhat of a luxury. Therefore, the optimal provisioning and configuration of deception systems that minimizes resource utilization while at the same time achieves security-related goals is of paramount importance to information technology (IT) departments.

Third, a high level of technical skill is required to satisfactorily provision a honeypot fleet, particularly given the organizational and computational complexity of modern cybersecurity computing environments. This operational overhead is financially expensive, even without considering that human-based decision making when it comes to honeypot fleet deployment is time intensive and prone to errors.

Therefore, several improvements are called for when it comes to honeypot fleet management and deployment. IT administrators desire more options and flexibility in fleet maintenance as well as a reduction in operational overhead. Decisions regarding the number, duration, configuration, and the like, of various honeypots in honeypot fleets can benefit from being abstracted away from a human being, rendering such decisions proactive instead of reactive. Finally, there is a pressing need to deploy honeypots using a robust methodology that accounts for the qualitative and quantitative nature of a given network environment and it's various constituent devices and/or components over the long term.

Disclosed herein are methods, systems, and processes of dynamically deploying and managing a fleet of honeypots based on a network environment's lifecycle that can, among other benefits, increase the flexibility of fleet management, reduce the operational overhead of fleet maintenance, and make proactive decisions regarding fleet configuration.

Example Honeypot Management Server

FIG. 1 is a block diagram 100 of a honeypot management server 105, according to one embodiment. Honeypot management server 105 can be any type of physical or virtual computing device and includes at least a honeypot management engine 110 with a honeypot service manager 115, an orchestration engine 120 with a deployment manager 125, and a network integration engine 130 with an attacker traffic manager 135.

As shown in FIG. 1, honeypot management server 105 is communicatively coupled via network 155, which can be any type of network or interconnection, to a data repository 145 (e.g., a storage device, a database, a cache, the "cloud," and the like), protected hosts 140(1)-(N) (e.g., production hosts and/or systems that are potential targets of malicious attacks), and honeypots 150(1)-(N) (e.g., deception systems or honeypot fleet).

Honeypot manager server 105 implements honeypot management engine 110. Honeypot management engine 110 includes at least honeypot service manager 115 and is configured to provide centralized configuration, deployment, management, and operation of a honeypot ecosystem (e.g., one or more honeypots 150(1)-(N)). Honeypot service manager 115 configures one or more honeypots 150(1)-(N) with honey services that mimic actual services that are offered by one or more of protected hosts 140(1)-(N). For example, honeypot service manager 115 can configure honeypot 150(1) to (appear to) respond to Server Message Block (SMB) protocol requests used by a ransomware attack and may cause honeypot 150(2) to represent itself as an enterprise database server that stores valuable information in data repository 145. Other examples of honey services include, but are not limited to, an emulated Secure Shell (SSH) honeypot service, a production Structured Query Language (SQL) service, and the like.

In one embodiment, orchestration engine 120 imports lifecycle information (e.g., protected host lifecycle data) from data repository 145 to determine the lifecycle of the (protected) network (e.g., network 155). Examples of lifecycle information include, but are not limited to, Dynamic Host Configuration Protocol (DHCP) log data, data collected by an agent-based computing system (purpose-built or a commodity offering), network infrastructure log data (e.g., associated with switches, routers, and the like), or protected host data generated by direct monitoring. Because orchestration engine 120 imports lifecycle information, orchestration engine 120 can use deployment manager 125 to determine the appropriate methodology to leverage the lifecycle information to achieve one or more desired honeypot fleet deployment outcomes.

In some embodiments, deployment manager 125 deploys one or more honeypots 150(1)-(N) in network 155 or removes one or more honeypots 150(1)-(N) from network 155 to maintain a (desired and configurable) ratio of honeypots to protected hosts. This operation is called a ratio management operation. This configurable ratio can be initially determined or supplied by a user and can then be automatically modified or updated by orchestration engine 120 based on the lifecycle information gleaned about the protected host. For example, the configurable ratio can be initially based on a requirement that a certain percentage of computing devices in network 155 be honeypots or on a user input specifying the exact ratio of honeypots to protected hosts in network 155. Orchestration engine 120 can then scale the initial configurable ratio based on operational changes in network 155.

In other embodiments, deployment manager 125 deploys one or more honeypots 150(1)-(N) in network 155 or removes one or more honeypots 150(1)-(N) from network 155 to take the place of one or more protected hosts 140(1)-(N) as they come and go from network 155. This operation is called a host replacement operation. In this example, the deployed honeypots can be explicit honeypot personality clones of departing protected hosts. It should be noted that such explicit honeypot personality clones can be created using the concepts disclosed in U.S. Utility patent application Ser. No. 16/132,319 titled "Honeypot Asset Cloning" and filed on Sep. 14, 2018 and concurrently filed United States Utility patent application titled "Live Deployment of Deception Systems."

In certain embodiments, network integration engine 130 permits honeypot management engine 110 and orchestration engine 120 to integrate with one or more network management systems (e.g., attacker traffic manager 135) to change network routing and flow to direct attacker traffic to the network location of honeypots (e.g., if the given honeypots are not deployed in the same Layer 2 (L2) network segment as the protected hosts). The ratio management operation and the host replacement operation are discussed in greater detail with respect to FIG. 2.

Example Orchestration Engine

Figure 2:
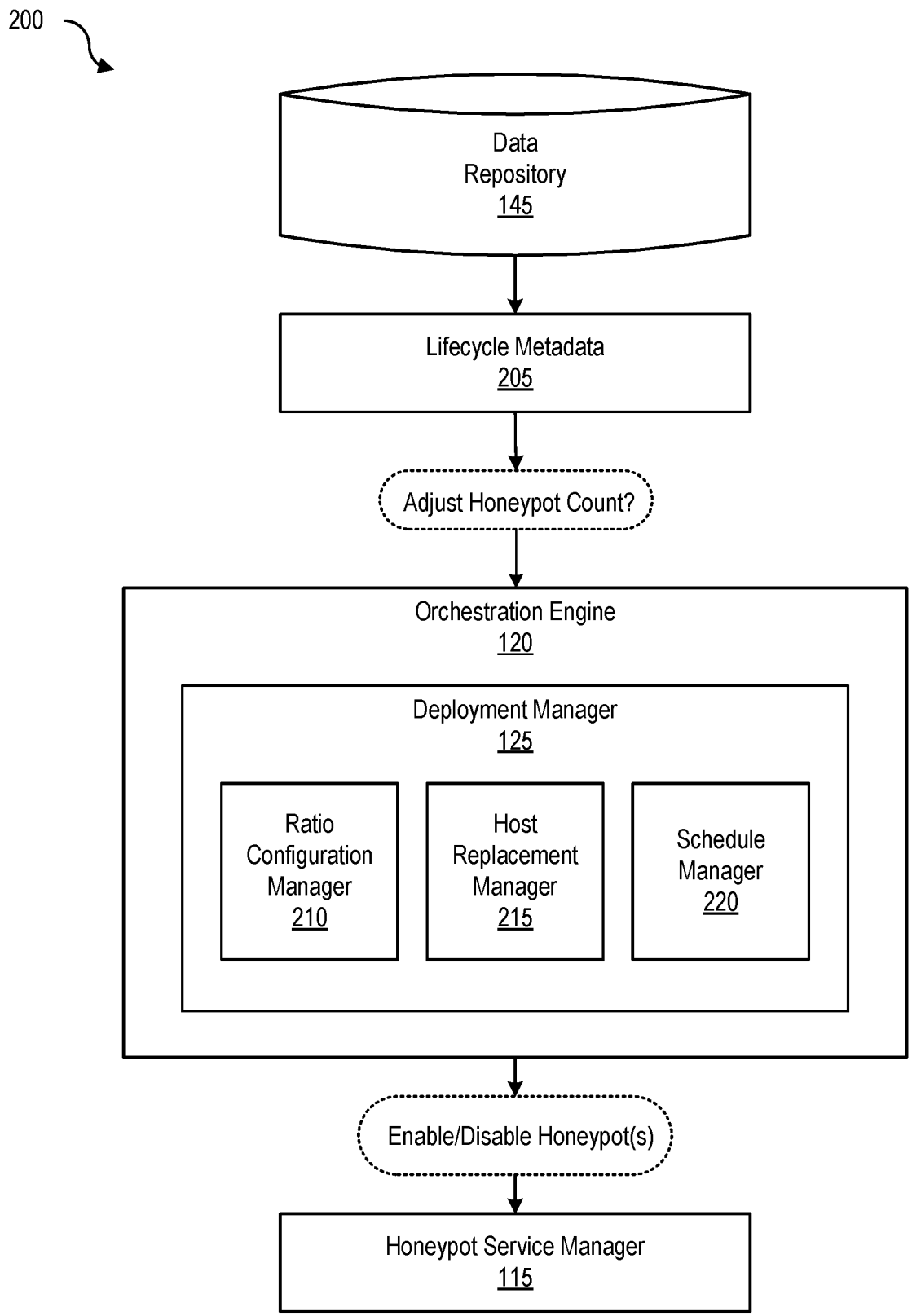
FIG. 2 is a block diagram 200 of an orchestration engine, according to one embodiment of the present disclosure.

FIG. 2 is a block diagram 200 of orchestration engine 120, according to one embodiment. As noted, orchestration engine can perform ratio management and host replacement with respect to honeypots 150(1)-(N). Orchestration engine 120 first retrieves, receives, imports or extracts lifecycle metadata 205 from data repository 145. As noted lifecycle metadata 205 can come from DHCP logs, Active Directory (AD), agents, network monitors, and the like. For example, lifecycle information can be imported based on a Media Access Control (MAC) address of a computer in the network. When the computer requests an Internet Protocol (IP) address, the request is timestamped and maintained in a DHCP log. Consequently, real time as well as historical lifecycle information associated with a protected host (e.g., requests for IP addresses, leases, renewal leases, departures, and the like, that typically take place over an extended period of time) can be imported as lifecycle metadata 205 by orchestration engine 120 (e.g., from the DHCP log) to be used by deployment manager 125 to perform ratio management or host replacement operations (or a combination of both operations based on a schedule).

In one embodiment, orchestration engine 120 can tailor the importing of lifecycle metadata 205 to a particular subnet of network 155. For example, a user may require high fidelity with an end user network as opposed to a server network. Therefore, because a honeypot fleet can emulate users for a specific subnet, orchestration engine 120 can import lifecycle metadata 205 associated with protected hosts operating in that specific subnet, allowing for flexibility in honeypot fleet maintenance.

In certain embodiments, lifecycle metadata 205 includes operational information from and about clients/hosts (e.g., protected hosts) as well as honeypots. Because lifecycle metadata 205 applies to the lifecycle of a network environment, lifecycle metadata 205 contributes to fleet deployment by mimicking the ebbs and flows of protected hosts (e.g., based on a percentage (configurable ratio) or based on gap-filling (host replacement)—by "adjust(ing) honeypot count" as shown in FIG. 2) and can scale to virtual machines, containers, and the like.

As shown in FIG. 2, deployment manager 125 includes a ratio configuration manager 210, a host replacement manager 215, and a schedule manager 220. As noted, orchestration engine 120, which implements deployment manager 125, imports lifecycle information from logs and various different sources. Therefore, orchestration engine 120 has information about network behavior as well as the historical lifecycle information about each protected host operating in the network. Deployment manager 125 can leverage this lifecycle information to achieve a desired honeypot deployment outcome based on ratio management performed by ratio configuration manager 210, host replacement performed by host replacement manager 215, or both performed by schedule manager 220. These salient concepts are now discussed separately.

Example of Ratio Management and Host Replacement

Ratio configuration manager 210 deploys or disables honeypots in a network to ensure that a base deployment is maintained at all times. For example, if the base deployment requires that at least ten percent of the computing devices in a network be composed of generically configured honeypots, ratio configuration manager 210 determines, based on lifecycle metadata 205, the number of honeypots that are required (to be provisioned and deployed or disabled and removed) in the given timeframe of the network environment (e.g., to maintain the ten percent base deployment).

Because the number of protected hosts in the network can vary significantly over a duration of time (e.g., during the course of a day), ratio configuration manager 210 automatically determines the number of honeypots that need to be deployed in the network or removed from the network to maintain the base deployment. Because each protected host can have a different lifecycle in the network, ratio configuration manager 210 adjusts or modifies the overall configurable ratio based on the lifecycle of each protected host. In certain embodiments, the configurable ratio can be based on honeypot management engine 110 identifying a "normal population" of network 155 (e.g., a range or threshold of protected hosts that are expected to be operational in network 155 during a period of time).

One benefit of dynamically deploying honeypots is preventing hackers and other malicious actors from determining that a target (e.g., a protected host) is a honeypot. For example, if a protected host leaves a network and is not promptly replaced by a honeypot, a hacker can deduce that the deployed honeypot is not a protected host (e.g., a production system). Therefore, because protected hosts typically come and go from a given network, host replacement manager 215 performs host replacement operations to deploy or disable honeypots in the network based on the ingress and egress of protected hosts. In one embodiment, host replacement manager 215 performs a preemptive host replacement operation by deploying a honeypot configured to mimic a protected host prior to the protected host leaving the network. For example, because orchestration engine 120 has real time information about the network environment, host replacement manager 215 can determine that a protected host is about to be taken off the network shortly (e.g., in ten minutes) and can deploy a replacement honeypot prior to the protected host leaving the network. Therefore, because of preemptive deployment, potential malicious actors are less likely to deduce (or determine) that the replacement honeypot is not the protected host.

In some embodiments, if lifecycle metadata 205 is not available but can be estimated (e.g., based on historical lifecycle metadata), schedule manager 220 performs a combination of ratio management and host replacement (e.g., by performing ratio management based on a base deployment requirement and adjusting the configurable ratio based on the estimated lifecycle of a given protected host and performing host replacement based on whether the protected host is actually active or inactive in the network—and adjusting the configurable ratio accordingly, for example, if needed to maintain the base deployment requirement).

Example Honeypot Dynamic Deployment Table

FIG. 3 is a table 300 that can be used to perform honeypot dynamic deployment, according to one embodiment. Honeypot dynamic deployment table 305 includes at least a lifecycle metadata field 310, a configurable ratio field 315, a protected host status field 320, and a deployment action field 325. Honeypot dynamic deployment table 305 can be maintained centrally by honeypot management server 105 and shared between honeypots 150(1)-(N) or can be maintained individually by one or more honeypots (e.g., based on their deployment status). For example, honeypot 150(1) can retrieve honeypot dynamic deployment table 305 from honeypot management server 105 prior to being deployed in the network and can transfer (the updated) honeypot dynamic deployment table 305 back to honeypot management server 105 prior to being removed from the network.

In one embodiment, if lifecycle metadata 205 is available and the base deployment requirement is 1:100 (e.g., a configurable ratio of 1 honeypot for every 100 protected hosts) and 1000 new hosts join the network, deployment manager 125 deploys 10 new honeypots in the network. Deployment manager 125 deploys one or more additional honeypots in the network or removes one or more existing honeypots from the network to maintain the 1:100 configurable ratio. Because orchestration engine 120 makes lifecycle metadata 205 available to deployment manager 125, ratio configuration manager 210 is able to proactively deploy or deprovision honeypots based on the lifecycle (historical and real time) of a given protected host.

From the deprovisioning perspective, if lifecycle metadata 205 indicates that 100 out of the 1000 hosts will leave the network at a given time, deployment manager 125 can schedule the removal of a single honeypot (that has been configured to mimic those 100 hosts) from the network to coincide with the 100 hosts leaving the network (e.g., at the given time) and can instruct honeypot service manager 115 to repurpose the honey services mimicked by that (removed) honeypot. Similarly, if configurable ratio field 315 indicates a base deployment requirement of 1:25 and lifecycle metadata 205 is available, deployment manager 125 discharges 5 honeypots from the network if protected host status field 320 indicates that 125 hosts are offline (or in the case or preemptive deprovisioning, are soon to be offline). Thus, honeypot dynamic deployment table 305 can be used to proactive and preemptively provision and deprovision honeypots.

In some embodiments, honeypot dynamic deployment table 305 can be used to perform host replacement. For example, if lifestyle metadata 205 is available and protected host status field 320 indicates that there are 100 hosts offline or 500 hosts online, host replacement manager 215 performs host replacement in the first instance by disabling or deprovisioning one or more honeypots that were standing in for or mimicking one or more of those 100 hosts. In the second instance, host replacement manager 215 performs host replacement by enabling or provisioning one or more honeypots to stand in for or mimic one or more of those 500 hosts. As noted, such enabling/disabling (or provisioning/deprovisioning) can be performed preemptively based on historical lifecycle information contained in lifecycle metadata 205 or maintained separately by each honeypot or honeypot fleet. Similarly, and as shown in FIG. 3, if lifecycle metadata 205 is unavailable, ratio configuration and host replacement can be performed based on estimates (e.g., deploy or disable honeypot(s) to maintain estimates).

Therefore, honeypot dynamic deployment table 305 can be used by honeypot management server 105 to dynamically manage a honeypot fleet. Because honeypot dynamic deployment table 305 can be updated based on new lifecycle information or a change in lifecycle information (as well as based on estimates), honeypot provisioning and deprovisioning to maintain a configurable ratio or to perform host replacement can be performed preemptively. In one embodiment, if a honeypot is provisioned on a physical computing device, honeypot dynamic deployment table 305 can be maintained in a cache of the physical computing device and distributed to other honeypots in the honeypot fleet. Because honeypot fleet deployment information is readily available to honeypots in the network as well as honeypot management server 105, honeypot dynamic deployment table 305 enables the preemptive provisioning or deprovisioning of honeypots based on whether a malicious attack is imminent or ongoing.

For example, if a honeypot in the honeypot fleet indicates that a malicious attack is ongoing, an upcoming host replacement operation can be preponed (e.g., to take production systems offline and replace them with honeypots that further entice the attacker while safeguarding the production systems). Similarly, deprovisioning honeypots can be postponed even if their corresponding production hosts leave the network or the configurable ratio can be increased or decreased irrespective of the base deployment requirements, if a malicious attack is ongoing (e.g., to provide more decoys during the attack).

Example Host Replacement Policy Implementation

In one embodiment, a host replacement policy is implemented and honeypots are deployed into the same L2 network segment as protected hosts. Dynamic MAC address assignments are used to prevent the honeypot's MAC from colliding with that of the protected host. In this example, the protected host is taken offline (e.g., a laptop is shutdown and taken home for the day). Orchestration engine 120 polls network switches and determines that the protected host is not currently in the MAC address table associated with the given network switches. In another embodiment, orchestration engine 120 also performs a Domain Name Service (DNS) resolution of the host name to reduce the chance that the protected host is live/active but outside its visibility (e.g., over a Virtual Private Network (VPN)).

In some embodiments, orchestration engine 120 utilizes methods, systems, and/or processes disclosed in "Honeypot Asset Cloning" (U.S. Utility patent application Ser. No. 16/132,319, filed on Sep. 14, 2018) and "Live Deployment of Deception Systems" (concurrently filed U.S. Utility patent application) to deploy an explicit (honeypot personality) clone (with a different MAC address) of the protected host.

In other embodiments, if and when the protected host returns to the network and is powered on, orchestration engine 120 detects the return of the production system via DHCP logs and by monitoring network switch MAC address tables. Orchestration engine 120 sends a signal to the honeypot that terminates honey services and uploads logs. Orchestration engine 120 then destroys the honeypot.

Example Processes to Dynamically Manage Deception Systems

Figure 4:
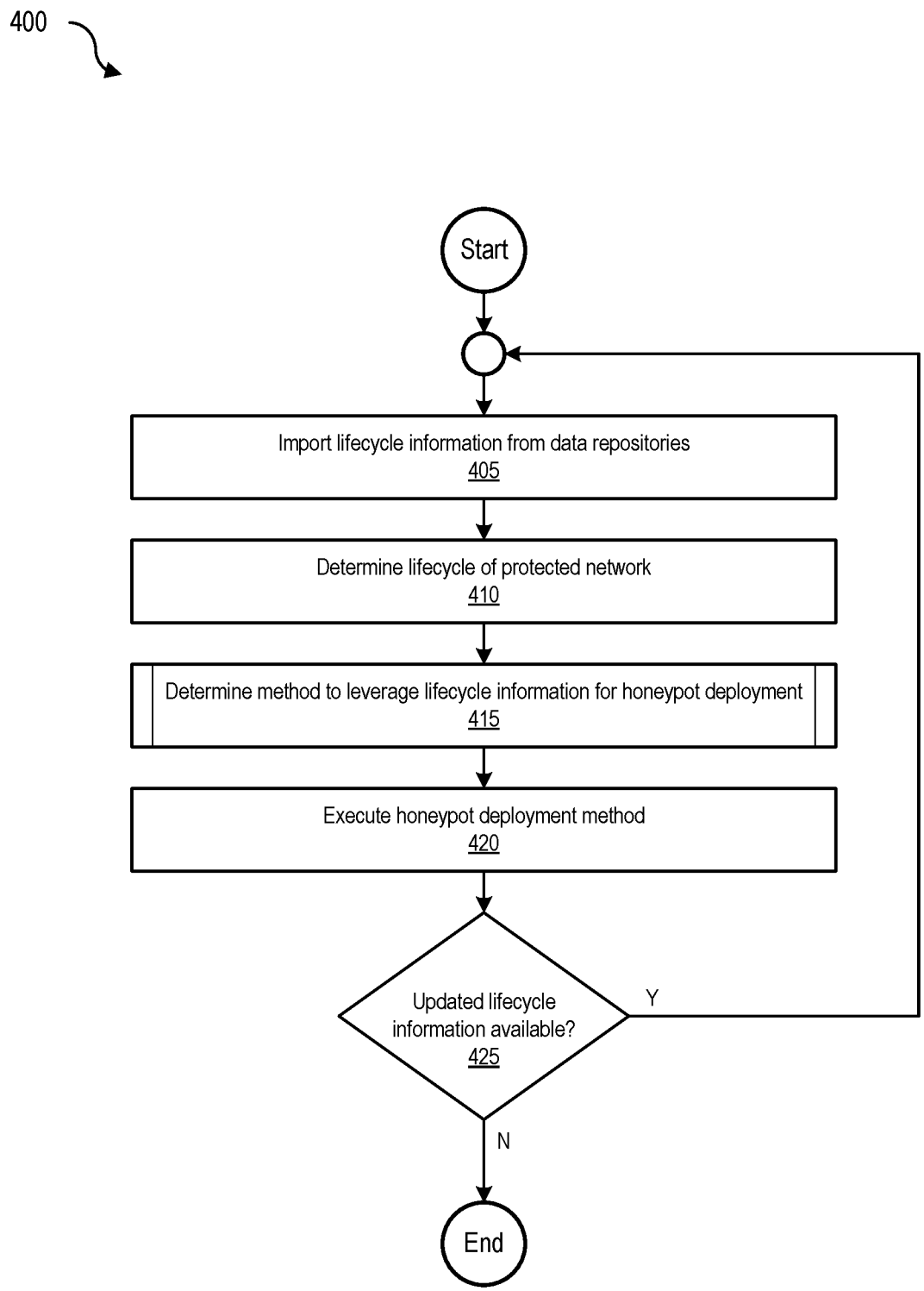
FIG. 4 is a flowchart 400 of a process to execute a honeypot deployment method, according to one embodiment of the present disclosure.

FIG. 4 is a flowchart 400 of a process to execute a honeypot deployment method, according to one embodiment. The process begins at 405 by importing lifecycle information (e.g., lifecycle metadata 205) from data repositories (e.g., data repository 145). As noted, lifecycle information can include, but is not limited to, DHCP log data, data collected by an agent-based computing system, network infrastructure log data, or protected host data generated by direct monitoring. At 410, the process determines the lifecycle of the protected network (e.g., the lifecycles of individual hosts as well the aggregate/overall lifecycle of the protected network).

At 415, the process determines a method to leverage lifecycle information for honeypot deployment (e.g., maintaining a configurable ratio of honeypots to production systems greater or equal to a base deployment requirement, performing host replacement based on whether production systems come and go from the network, adjusting a host replacement policy or the configurable ratio if there is an ongoing malicious attack, and the like). At 420, the process executes the honeypot deployment method and at 425 determines if there is updated lifecycle information available. If there is updated lifecycle information available, the process loops to 405. Otherwise, the process ends.

Figure 5:
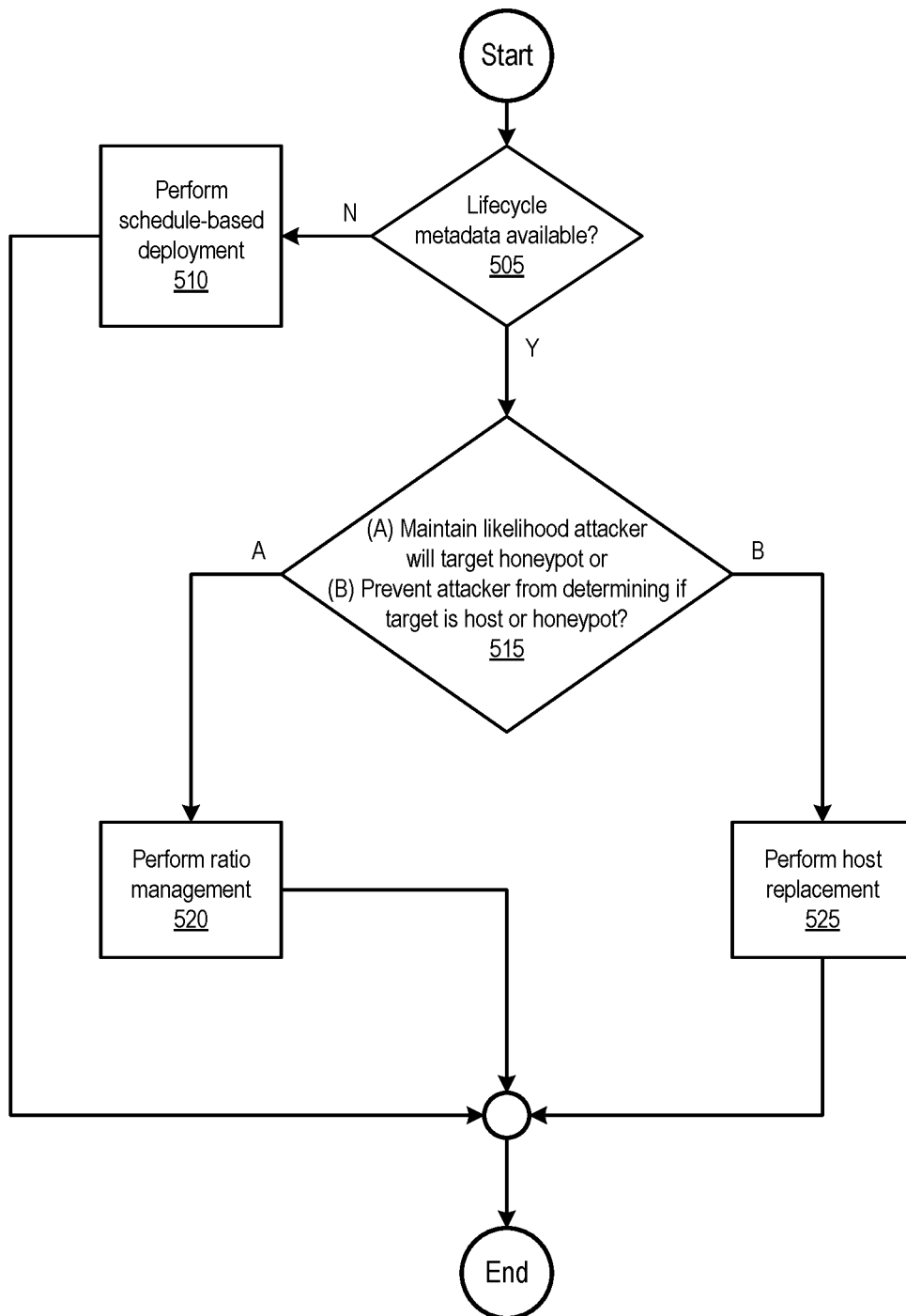
FIG. 5 is a flowchart 500 of a process to perform ratio management or host replacement, according to one embodiment of the present disclosure.

FIG. 5 is a flowchart 500 of a process to perform ratio management or host replacement, according to one embodiment. The process begins at 505 by determining whether lifecycle metadata is available. If lifecycle metadata is not available, the process, at 510, performs schedule-based deployment (e.g., using schedule manager 220 as shown in FIG. 2). For example, and as shown in honeypot dynamic deployment table 305 of FIG. 3, lifecycle metadata can be estimated based on historical information (e.g., network lifecycle of a previous deployment) and either ratio management and/or host replacement can be performed (e.g., manually by a user).

However, if lifecycle metadata is available, the process at 515 determines whether to (A) maintain the likelihood that an attacker (e.g., a hacker or other malicious actor) will target one or more honeypots (e.g., in the network) or (B) prevent the attacker from determining whether the target (of the malicious attack) is a host (e.g., a protected host or production system) or a honeypot (e.g., a provisioned decoy that mimics the intended target). In this example, options (A) and (B) require at least one honeypot deployment method (as discussed with respect to FIG. 4).

If the goal of honeypot deployment is to maintain the likelihood that an attacker will (or is likely to) target one or more honeypots, the process ends at 520 by performing ratio management (e.g., based on a base/initial deployment requirement—which as noted, can be adjusted or appropriately configured (in real time) if a malicious attack is ongoing—resulting in a smaller or larger ratio of honeypots to protected hosts). However, if the goal of honeypot deployment is to prevent an attacker from determining whether an intended target is a host (e.g., a production system that is protected) or a honeypot, the process ends at 525 by performing host replacement (e.g., preemptively, in some cases, as previously discussed).

Figure 6:
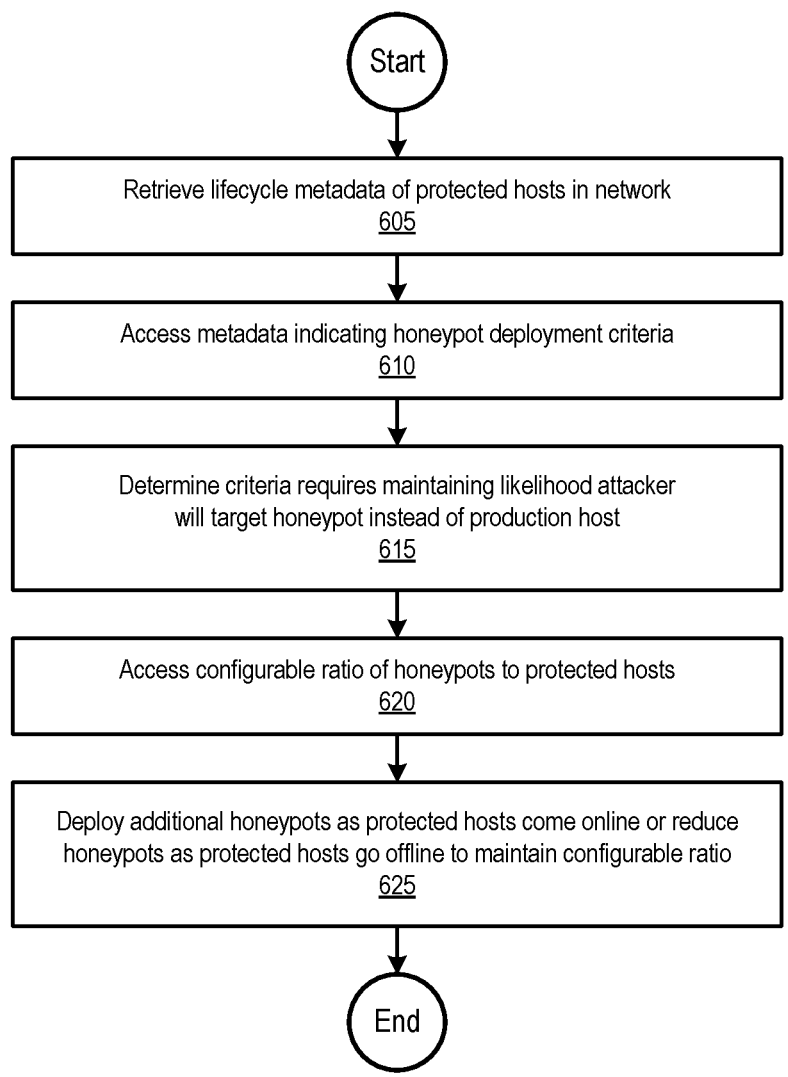
FIG. 6 is a flowchart 600 of a process to deploy or disable honeypots based on a configurable ratio, according to one embodiment of the present disclosure.

FIG. 6 is a flowchart 600 of a process to deploy or disable honeypots based on a configurable ratio, according to one embodiment. The process begins at 605 by retrieving lifecycle metadata of protected hosts in a network. At 610, the process accesses metadata indicating honeypot deployment criteria. For example, such honeypot deployment criteria metadata can include, but is not limited to, metadata indicating a base deployment requirement for a ratio of honeypots to production hosts, metadata indicating that the goal of honeypot deployment is to maintain the likelihood that an attacker will (or is likely to) target one or more honeypots, metadata indicating that the goal of honeypot deployment is to prevent an attacker from determining whether an intended target is honeypot or a host, and the like.

At 615, the process determines that the deployment criteria requires maintaining (or increasing) the likelihood that an attacker will (or is likely to) target a honeypot instead of a production host, and at 620, accesses a configurable ratio of honeypots to protected hosts (e.g., from lifecycle metadata or from honeypot deployment criteria metadata). The process ends at 625 by deploying additional honeypots as protected hosts come online or reduces honeypots as protected hosts go offline to maintain the configurable ratio.

Figure 7:
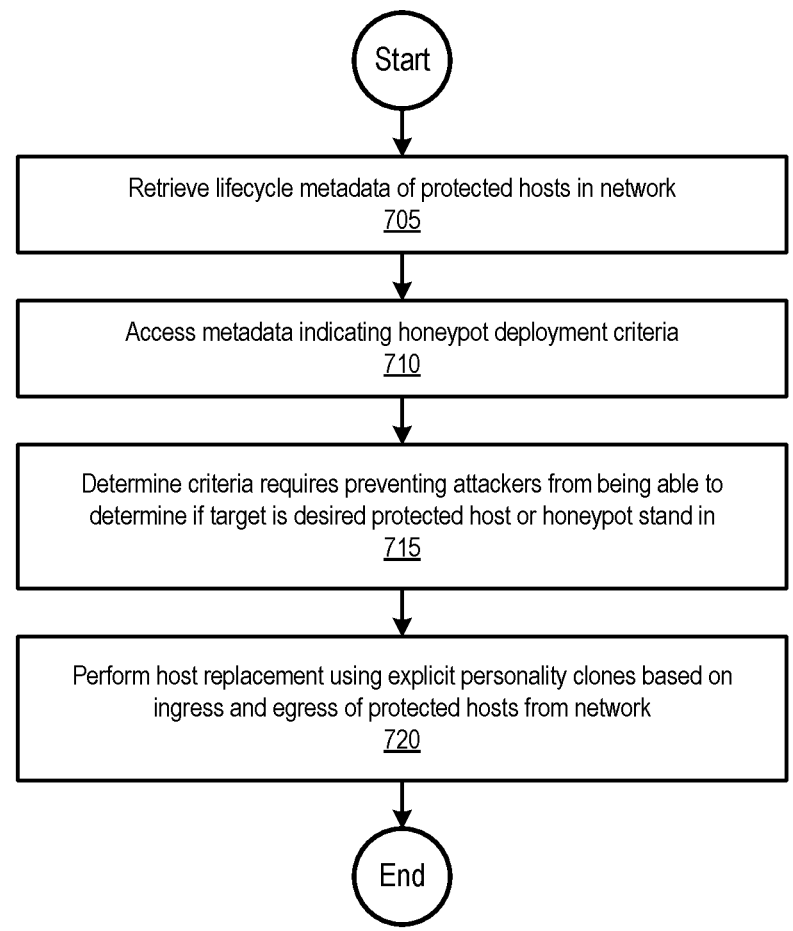
FIG. 7 is a flowchart 700 of a process to perform host replacement using explicit honeypot personality clones, according to one embodiment of the present disclosure.

FIG. 7 is a flowchart 700 of a process to perform host replacement using explicit honeypot personality clones, according to one embodiment. The process begins at 705 by retrieving lifecycle metadata of protected hosts in a network, and at 710, accesses metadata indicating honeypot deployment criteria. At 715, the process determines that the criteria requires preventing attackers from being able to determine whether a target is a desired protected host or a honeypot stand in. The process ends at 720 by performing host replacement using explicit personality clones based on the ingress and egress of protected hosts from the network.

Therefore, the methods, systems, and processes disclosed herein dynamically deploy and manage a honeypot fleet based on a network environment's lifecycle. Deploying and managing the honeypot fleet in this manner can increase the flexibility of fleet management and reduce the operational overhead of fleet maintenance while permitting the timely implementation of proactive decisions regarding fleet configuration to maintain or increase the likelihood that an attacker will target a honeypot or to prevent an attacker from determining whether an intended target is a protected host or a honeypot.

Example Computing Environment

Figure 8:
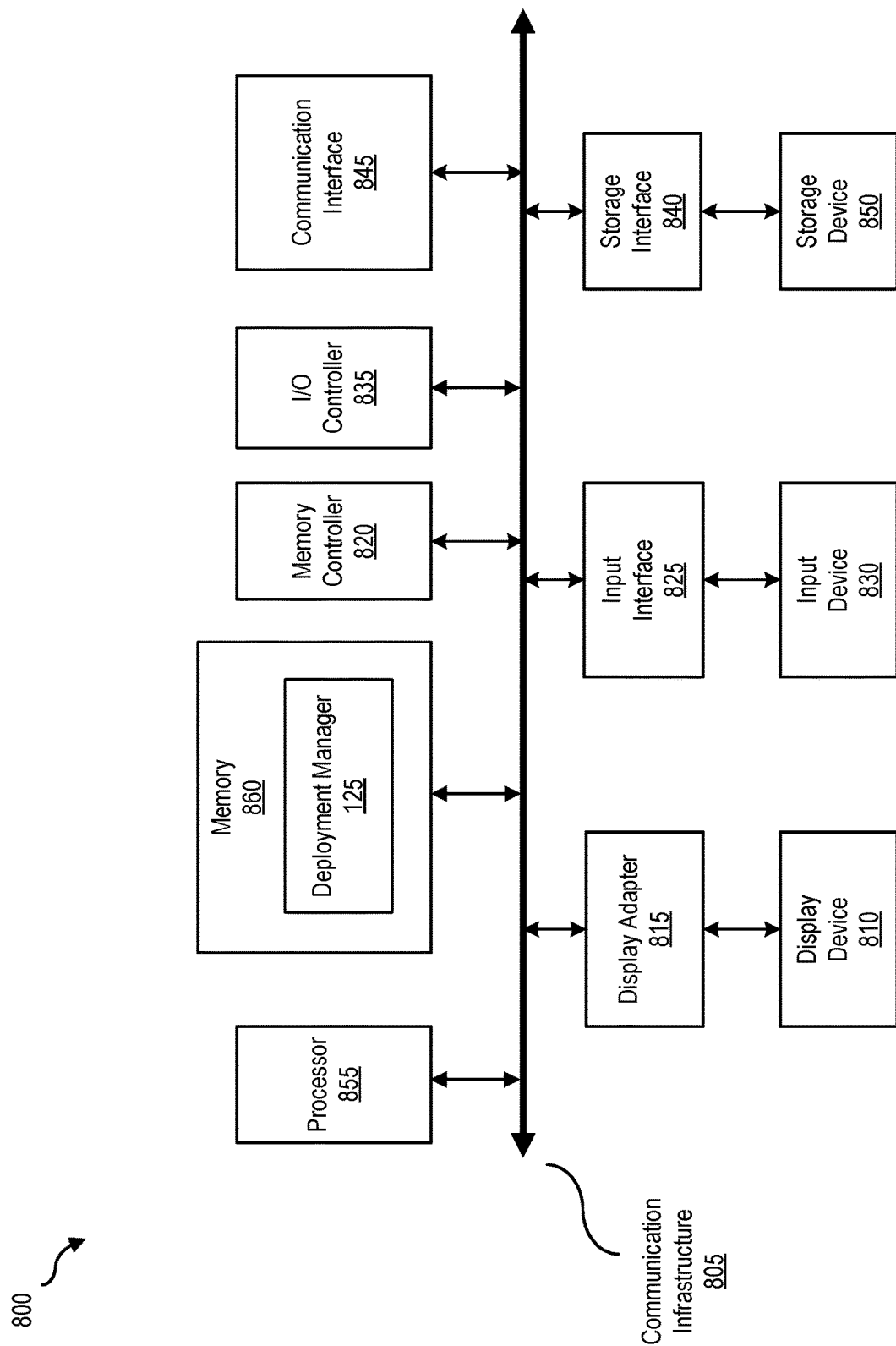
FIG. 8 is a block diagram 800 of a computing system, illustrating how a deployment manager can be implemented in software, according to one embodiment of the present disclosure.

FIG. 8 is a block diagram 800 of a computing system, illustrating how deployment manager 125 can be implemented in software, according to one embodiment. Computing system 800 can include honeypot management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes deployment manager 125, computing system 800 becomes a special purpose computing device that is configured to dynamically manage and deploy deception systems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing deployment manager 125 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

Figure 9:
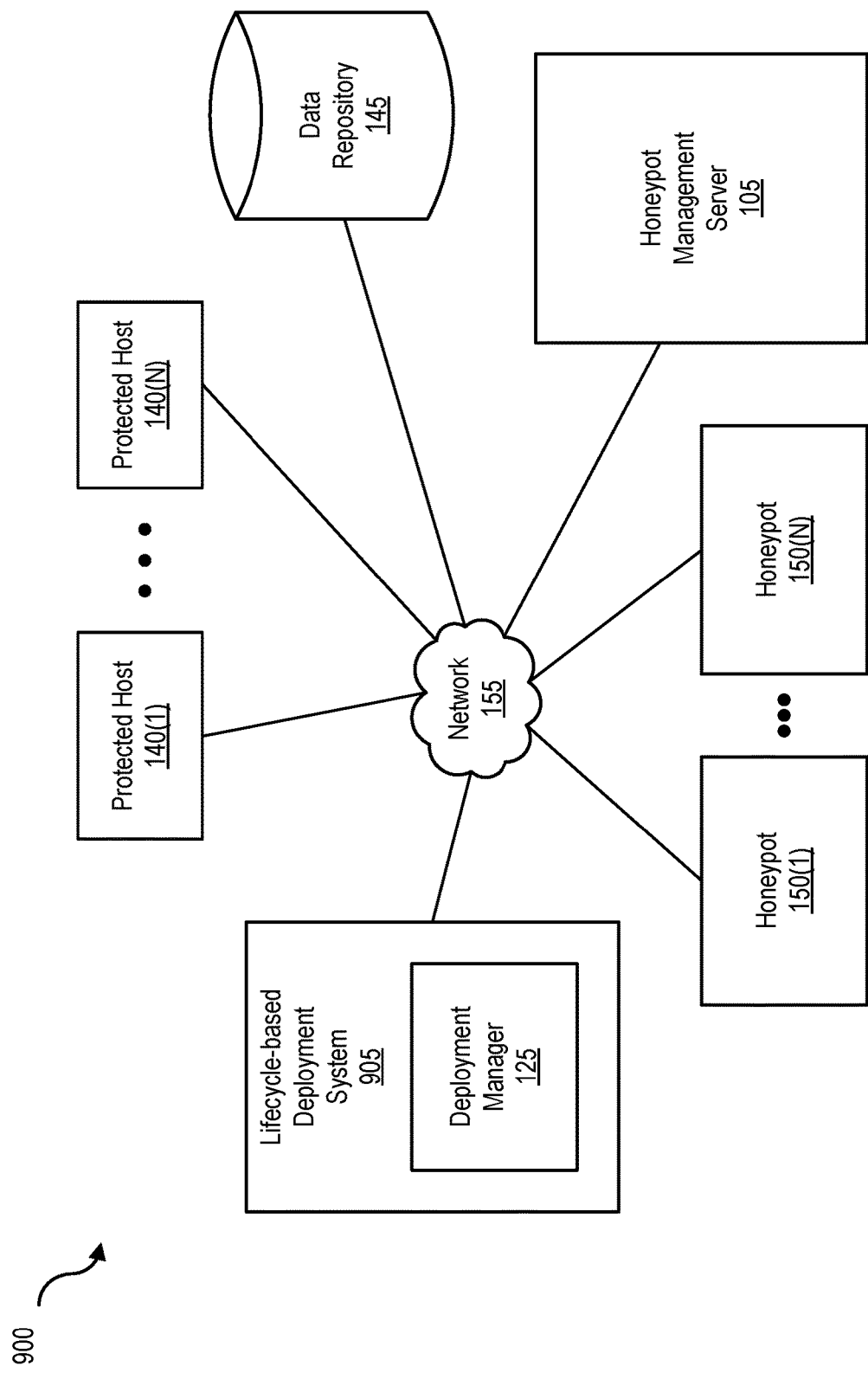
FIG. 9 is a block diagram 900 of a networked system, illustrating how various devices can communicate via a network, according to one embodiment of the present disclosure.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware. Example Networking Environment FIG. 9 is a block diagram of a networked system, illustrating how various computing devices can communicate via a network, according to one embodiment. Network 155 generally represents any type or form of computer network or architecture capable of facilitating communication between honeypot management server 105 and honeypots 150(1)-(N). For example, network 155 can be a Wide Area Network (WAN) (e.g., the Internet) or a Local Area Network (LAN).

In certain embodiments, a communication interface, such as communication interface 845 in FIG. 8, may be used to provide connectivity between honeypot management server 105 and honeypots 150(1)-(N), and network 155. The embodiments described and/or illustrated herein are not limited to the Internet or any particular network-based environment.

In some embodiments, lifecycle-based deployment system 905 may be part of honeypot management server 105 or one or more of honeypots 150(1)-(N), or may be separate. If separate, lifecycle-based deployment system 905 and honeypot management server 105 or honeypots 150(1)-(N) may be communicatively coupled via network 155. In one embodiment, all or a portion of one or more of the disclosed embodiments may be encoded as a computer program and loaded onto and executed by honeypot management server 105, one or more of honeypots 150(1)-(N), lifecycle-based deployment system 905, or any combination thereof, and may be stored on data repository 145, honeypot management server 105, one or more of honeypots 150(1)-(N), or lifecycle-based deployment system 905, and distributed over network 155.

In some examples, all or a portion of honeypot management server 105, honeypots 150(1)-(N), or lifecycle-based deployment system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, deployment manager 125 may transform the behavior of honeypot management server 105, honeypots 150(1)-(N), or lifecycle-based deployment system 905 to perform management of deception systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    retrieving lifecycle metadata associated with a plurality of protected hosts in a network;
    accessing a configurable ratio of a plurality of honeypots to the plurality of protected hosts; and
    deploying in or discharging from, the network, one or more honeypots of the plurality of honeypots based on:
        the configurable ratio if the lifecycle metadata can be retrieved or determined, or
        a schedule if the lifecycle metadata cannot be retrieved or determined, but can be estimated.

2. The computer-implemented method of claim 1, further comprising:
    determining that the plurality of honeypots and the plurality of protected hosts do not share a Layer 2 (L2) network segment; and
    modifying a network route in the network to direct attacker traffic to a network location of the plurality of honeypots.

3. The computer-implemented method of claim 1, further comprising:
    determining that a protected host of the plurality of protected hosts is no longer part of the network; and
    performing a host replacement operation to replace the protected host with a honeypot that is an explicit personality clone of the protected host.

4. The computer-implemented method of claim 1, wherein
    the lifecycle metadata comprises Dynamic Host Configuration Protocol (DHCP) log data, data collected by an agent-based computing system, network infrastructure log data, or protected host data generated by direct monitoring.

5. The computer-implemented method of claim 2, wherein
    the host replacement operation is performed based on one or more deployment criteria.

6. A non-transitory computer readable storage medium comprising program instructions executable to:
    retrieve lifecycle metadata associated with a plurality of protected hosts in a network;
    access a configurable ratio of a plurality of honeypots to the plurality of protected hosts; and
    deploy in or discharge from, the network, one or more honeypots of the plurality of honeypots based on:
        the configurable ratio if the lifecycle metadata can be retrieved or determined, or
        a schedule if the lifecycle metadata cannot be retrieved or determined, but can be estimated.

7. The non-transitory computer readable storage medium of claim 6, further comprising:
    determining that the plurality of honeypots and the plurality of protected hosts do not share a Layer 2 (L2) network segment; and
    modifying a network route in the network to direct attacker traffic to a network location of the plurality of honeypots.

8. The non-transitory computer readable storage medium of claim 6, further comprising:
    determining that a protected host of the plurality of protected hosts is no longer part of the network; and
    performing a host replacement operation to replace the protected host with a honeypot that is an explicit personality clone of the protected host.

9. The non-transitory computer readable storage medium of claim 6, wherein
    the lifecycle metadata comprises Dynamic Host Configuration Protocol (DHCP) log data, data collected by an agent-based computing system, network infrastructure log data, or protected host data generated by direct monitoring.

10. The non-transitory computer readable storage medium of claim 7, wherein the host replacement operation is performed based on one or more deployment criteria.

11. A system comprising:

one or more processors; and a memory coupled to the one or more processors, wherein the memory stores program instructions executable by the one or more processors to:

retrieve lifecycle metadata associated with a plurality of protected hosts in a network;

access a configurable ratio of a plurality of honeypots to the plurality of protected hosts; and deploy in or discharge from, the network, one or more honeypots of the plurality of honeypots based on:
  the configurable ratio if the lifecycle metadata can be retrieved or determined, or
  a schedule if the lifecycle metadata cannot be retrieved or determined, but can be estimated.

12. The system of claim 11, further comprising:

determining that the plurality of honeypots and the plurality of protected hosts do not share a Layer 2 (L2) network segment; and modifying a network route in the network to direct attacker traffic to a network location of the plurality of honeypots.

13. The system of claim 11, further comprising:

determining that a protected host of the plurality of protected hosts is no longer part of the network; and performing a host replacement operation to replace the protected host with a honeypot that is an explicit personality clone of the protected host.

14. The system of claim 13, wherein the lifecycle metadata comprises Dynamic Host Configuration Protocol (DHCP) log data, data collected by an agent-based computing system, network infrastructure log data, or protected host data generated by direct monitoring, and the host replacement operation is performed based on one or more deployment criteria.

* * * * *